Sept. 16, 1941.   R. B. POTTER   2,256,035
MOTOR
Filed Feb. 19, 1940   3 Sheets-Sheet 1

R. B. Potter
INVENTOR.
BY C. A. Snow & Co.
ATTORNEYS.

Sept. 16, 1941.  R. B. POTTER  2,256,035

MOTOR

Filed Feb. 19, 1940  3 Sheets-Sheet 2

R. B. Potter
INVENTOR.

BY *Ashnow & Co.*
ATTORNEYS.

Sept. 16, 1941.       R. B. POTTER       2,256,035
MOTOR
Filed Feb. 19, 1940       3 Sheets-Sheet 3

R. B. Potter
INVENTOR.
BY CA Snow & Co.
ATTORNEYS.

Patented Sept. 16, 1941

2,256,035

UNITED STATES PATENT OFFICE 2,256,035

MOTOR

Rutherford B. Potter, Santa Barbara, Calif., assignor by order of court to Sadie E. Potter Application February 19, 1940, Serial No. 319,793

1 Claim. (Cl. 172—36)

This invention relates to motors and while the principle of operation is applicable to various types of rotary motors, whether operated by steam, air, gas or other fluid, it is especially adapted for electric motors.

An object of the invention is to employ, in lieu of a stator, such as the field of a motor, a rotatable element (which can be the field) mounted for rotation oppositely to the rotor or armature, the two being coupled through a transmission of proper ratio whereby power will be transmitted from both the rotor and the surrounding structure to a driven shaft.

In every electric motor the field, if rotated relative to a fixed armature, has a speed of rotation differing from that of the armature if rotated relative to the stationary field. The ratio of rotation varies in motors of different types. In the present invention it is designed to utilize transmission means between both the rotor (armature) and the surrounding structure (field) whereby the predetermined ratio of rotation is maintained as the two elements rotate in opposite directions and at different normal speeds, whereby power is transmitted to a driven shaft from both elements, thereby utilizing power which would be lost should one of the elements remain stationary. In other words, it is an object of this invention to apply in an electric motor, all of the power of the armature, its fulcrum, the field frame, and its fulcrum, directly to the driven shaft through a double leverage action, thereby to increase the power of the motor.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings—

Figure 1:
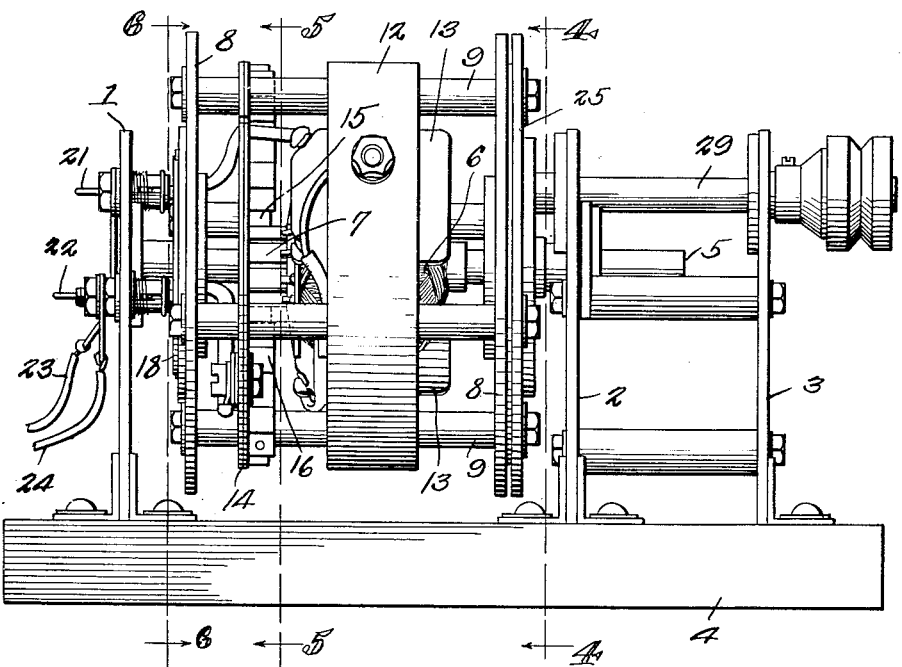
Figure 1 is a front elevation of an electric motor embodying the present improvements.
Figure 2:
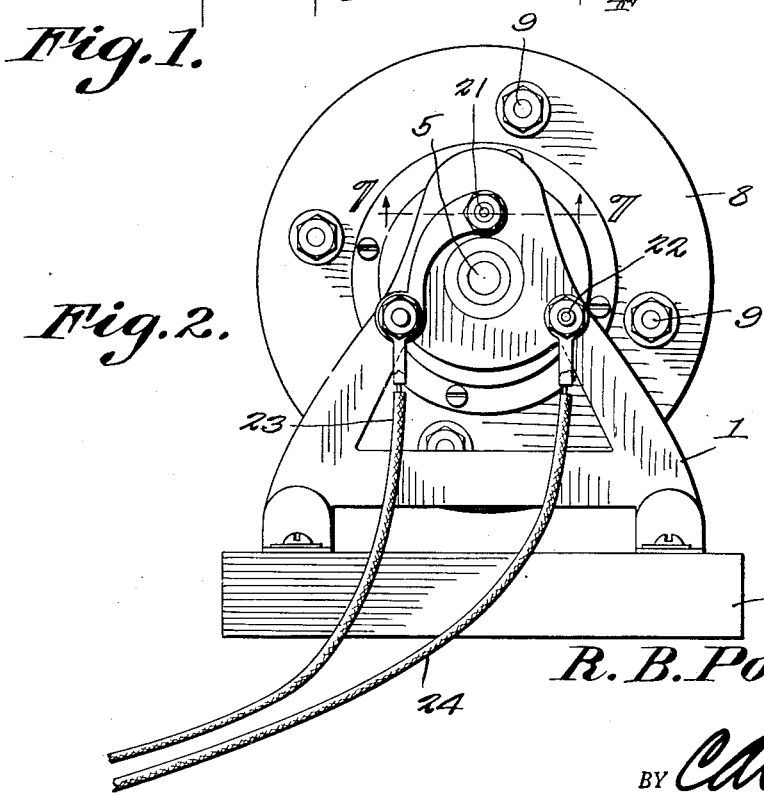
Figure 2 is an end elevation.
Figure 3:
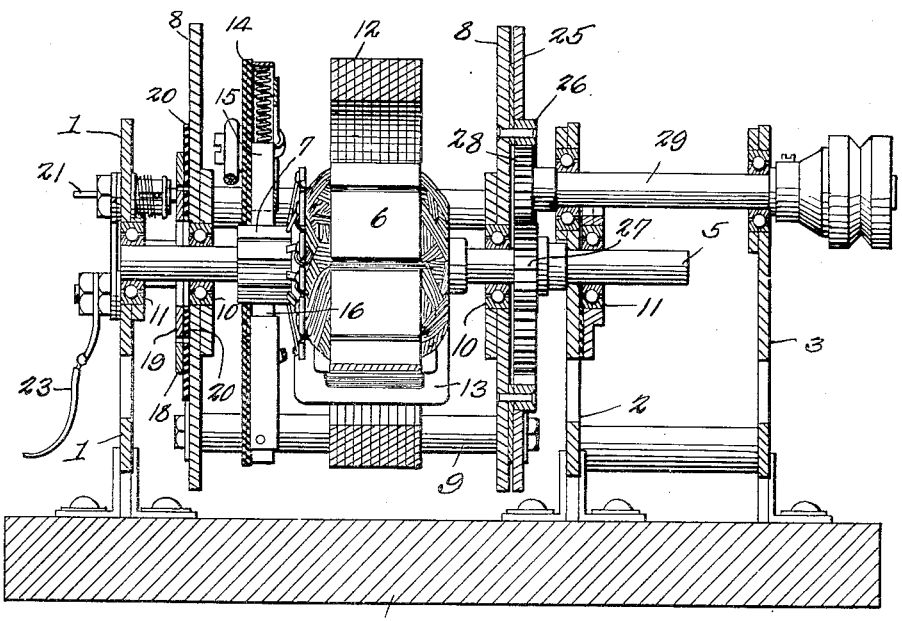
Figure 3 is a central vertical longitudinal section, the armature being shown in elevation.
Figure 4:
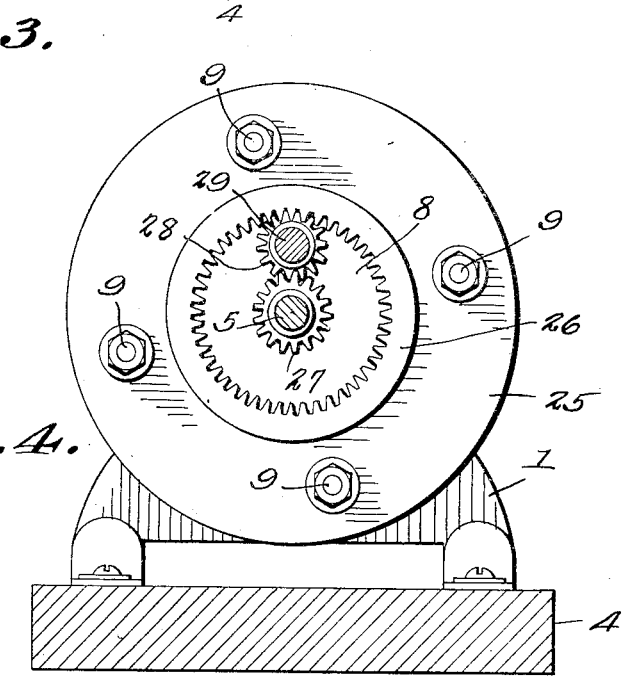
Figure 4 is a section on line 4—4, Figure 1.
Figure 5:
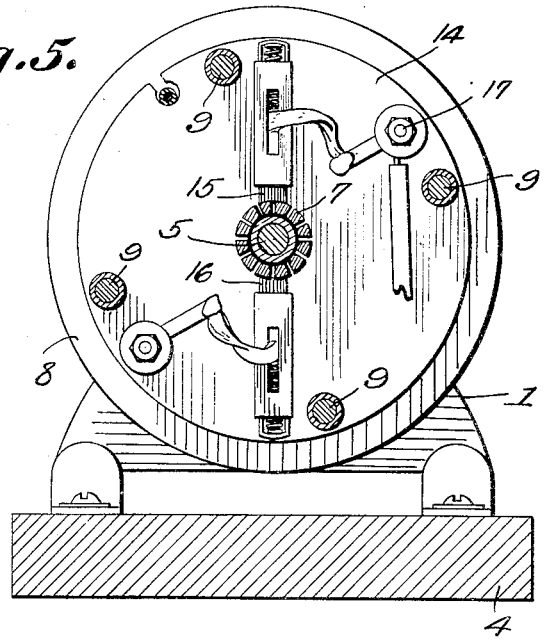
Figure 5 is a section on line 5—5, Figure 1.
Figure 6:
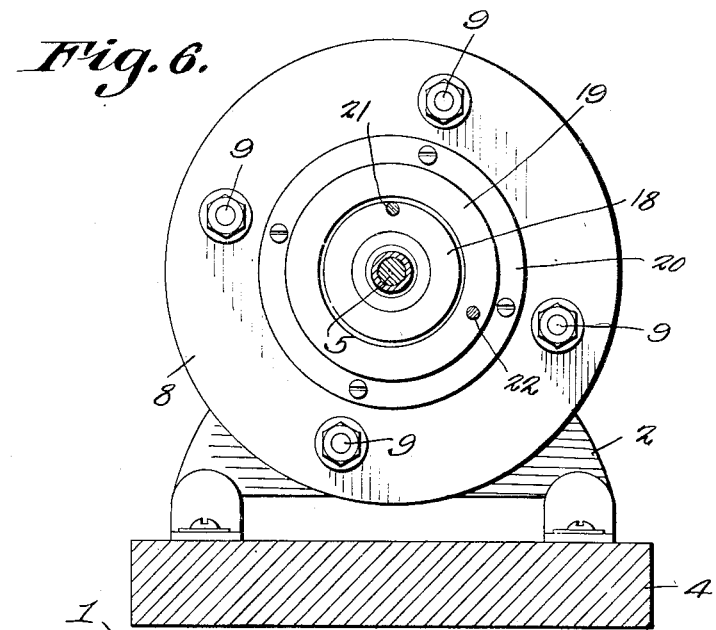
Figure 6 is a section on line 6—6, Figure 1.
Figure 7:
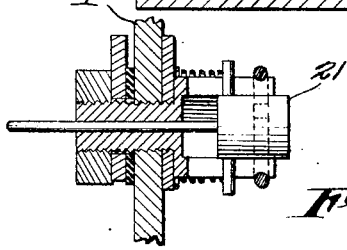
Figure 7 is a section through one end on line 7—7, Figure 2.

Referring to the figures by characters of reference, 1, 2 and 3 designate frame members adapted to be fixedly mounted on a base 4 or other structure and journaled in the members 1 and 2 is a shaft 5 on which is mounted an armature 6 and its commutator 7. A frame is mounted for rotation on shaft 5 between the members 1 and 2 and includes disks 8 fixedly connected by cross members or rods 9. Antifriction bearings 10 can be provided between disks 8 and shaft 5 and similar bearings 11 can be provided for shaft 5 in members 1 and 2.

A frame in the form of a laminated ring 12 is carried by the cross members 9 and supports the field coils 13 which cooperate with the armature. A disk 14 of insulating material is supported by the cross members 9 and rotates with the field. This disk carries opposed spring-pressed brushes 15 and 16 which contact with commutator 7. One of these brushes, 15, is electrically connected to a post 17 on disk 14 and thence to the outer terminal of one of the field coils 13. The outer terminal of the other coil 13 is electrically connected to a contact ring 18 on one disk 8 while another contact ring 19, carried by said disk 8 is electrically connected to the other brush 16. Both rings are spaced from disk 8 by insulating rings 20.

Spring pressed contacts 21 and 22 are connected to the respective leads 23 and 24 used for directing current to the motor. These two contacts are insulated from each other and contact 21 is in constant engagement with the inner ring 18 while contact 22 is in constant engagement with ring 19.

A ring 25 is attached to and rotates with one disk 8 and carries an internal gear 26 concentric with shaft 5. A gear 27 is secured to shaft 5 and is surrounded by gear 26. Interposed between and meshing with gears 26 and 27 is a driven gear 28 secured to and rotatable with a driven shaft 29. This shaft is journaled in the frame members 2 and 3 and the gear 28 is located on one end thereof.

The electric motor can be of any type and as the wiring is no part of the invention it is not deemed necessary to describe or show it in detail.

The ratio of the gears is the same as the predetermined speed of rotation of the armature and field. Consequently when the motor is energized the rotation of these two movable elements in opposite directions at normal speeds will result in the transmission of power from both elements to the driven shaft so that the entire energy of the motor is utilized and a pronounced increase of power is effected.

As before stated the same principle of operation can be applied to engines propelled by air, steam or gas, two oppositely rotating power driven elements of different speeds, being substituted for a rotor and a stator.

Attention is directed to the fact that the armature gear 27 engages gear 28 at a point diametrically opposite to the point of engagement between gears 28 and 26. Therefore, as energy is transmitted to opposed parts of gear 28, a double leverage is transmitted to the driven shaft without the use of intermediate gears, shafts, etc. Consequently there is utilized the entire energy of the motor excepting a very small portion consumed by the friction load.

What is claimed is:

In a motor the combination with fixed bearing members, of parallel shafts journalled therein, meshing gears secured to the shafts, an armature connected to one of the shafts, and a structure, including field coils, mounted for rotation on said armature shaft, said structure including fixedly connected disks at opposite sides of and spaced from the armature, an internal gear secured to one of the disks and positioned to receive motion from the gear on the armature shaft through the gear on the other shaft, all of the gears being proportioned to the relative speeds of the armature and the field coil structure for transmitting motion in one direction from the armature shaft and from the rotatable structure to the other shaft, a commutator rotatable with the armature, brushes rotatable with the field coils, and cooperating with the commutator, spaced insulated contact rings on one of the disks, and electrically connected to the respective commutator brushes, and brushes carried by one of the fixed bearing members for contact with the respective rings and connection with the leads of an electric circuit.

RUTHERFORD B. POTTER.